United States Patent
Hall et al.

(10) Patent No.: US 9,174,269 B2
(45) Date of Patent: Nov. 3, 2015

(54) TOOL FOR CONNECTING AND DISCONNECTING CONVEYING CHAIN AND METHOD

(71) Applicant: Ramsey Products Corporation, Charlotte, NC (US)

(72) Inventors: William Carleton Hall, Gastonia, NC (US); Philippe Alex Rojzman, Newton, NC (US); Charles Stone Stalvey, Mt. Holly, NC (US)

(73) Assignee: RAMSEY PRODUCTS CORPORATION, Charlotte, NC (US)

( * ) Notice: Subject to any disclaimer, the term of this patent is extended or adjusted under 35 U.S.C. 154(b) by 0 days.

(21) Appl. No.: 14/313,365

(22) Filed: Jun. 24, 2014

(65) Prior Publication Data

US 2015/0224565 A1  Aug. 13, 2015

Related U.S. Application Data

(60) Provisional application No. 61/937,870, filed on Feb. 10, 2014.

(51) Int. Cl.
*B21L 21/00* (2006.01)
*B21L 9/06* (2006.01)
*B25B 27/02* (2006.01)

(52) U.S. Cl.
CPC ............. *B21L 9/065* (2013.01); *B21L 21/00* (2013.01); *B25B 27/023* (2013.01)

(58) Field of Classification Search
CPC ........ B21L 9/065; B21L 21/00; B25B 27/023
USPC .............................................................. 59/7
See application file for complete search history.

(56) References Cited

U.S. PATENT DOCUMENTS

| | | | | |
|---|---|---|---|---|
| 3,233,402 A | * | 2/1966 | Urbaitis | 59/7 |
| 3,234,634 A | * | 2/1966 | Johnson et al. | 29/243.54 |
| 5,203,158 A | * | 4/1993 | Bowers | 59/7 |
| 6,880,323 B2 | * | 4/2005 | Coleman | 59/7 |
| 7,721,520 B2 | * | 5/2010 | Komeya et al. | 59/7 |

* cited by examiner

*Primary Examiner* — David B Jones
(74) *Attorney, Agent, or Firm* — Shumaker, Loop & Kendrick, LLP

(57) ABSTRACT

A tool is provided for connecting and disconnecting links of a conveyor chain. The tool includes a base, a chain guide plate mounted on the base for supporting a length of conveyor chain in a fixed position relative to the base, and a backup block carried on the base. A pin extraction/insertion block is positioned on the base with the chain guide plate positioned between the backup block and the pin extraction/insertion block. A ram is carried on the pin extraction/insertion block for extracting a pin from a position in aligned holes in adjacent links while the chain is held in its fixed position, and an insertion rod is carried on the pin extraction/insertion block for inserting a pin in aligned holes in adjacent links.

24 Claims, 19 Drawing Sheets

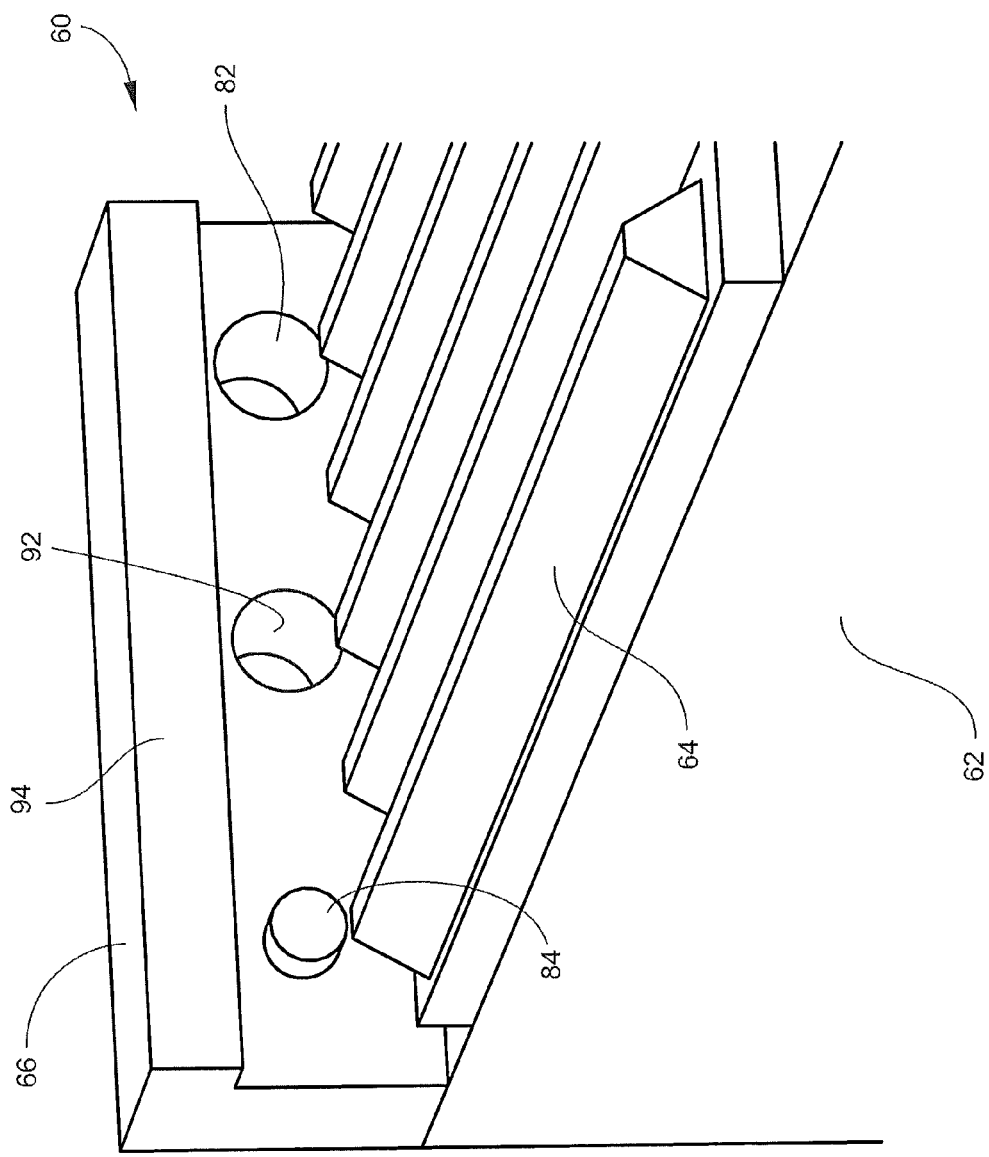

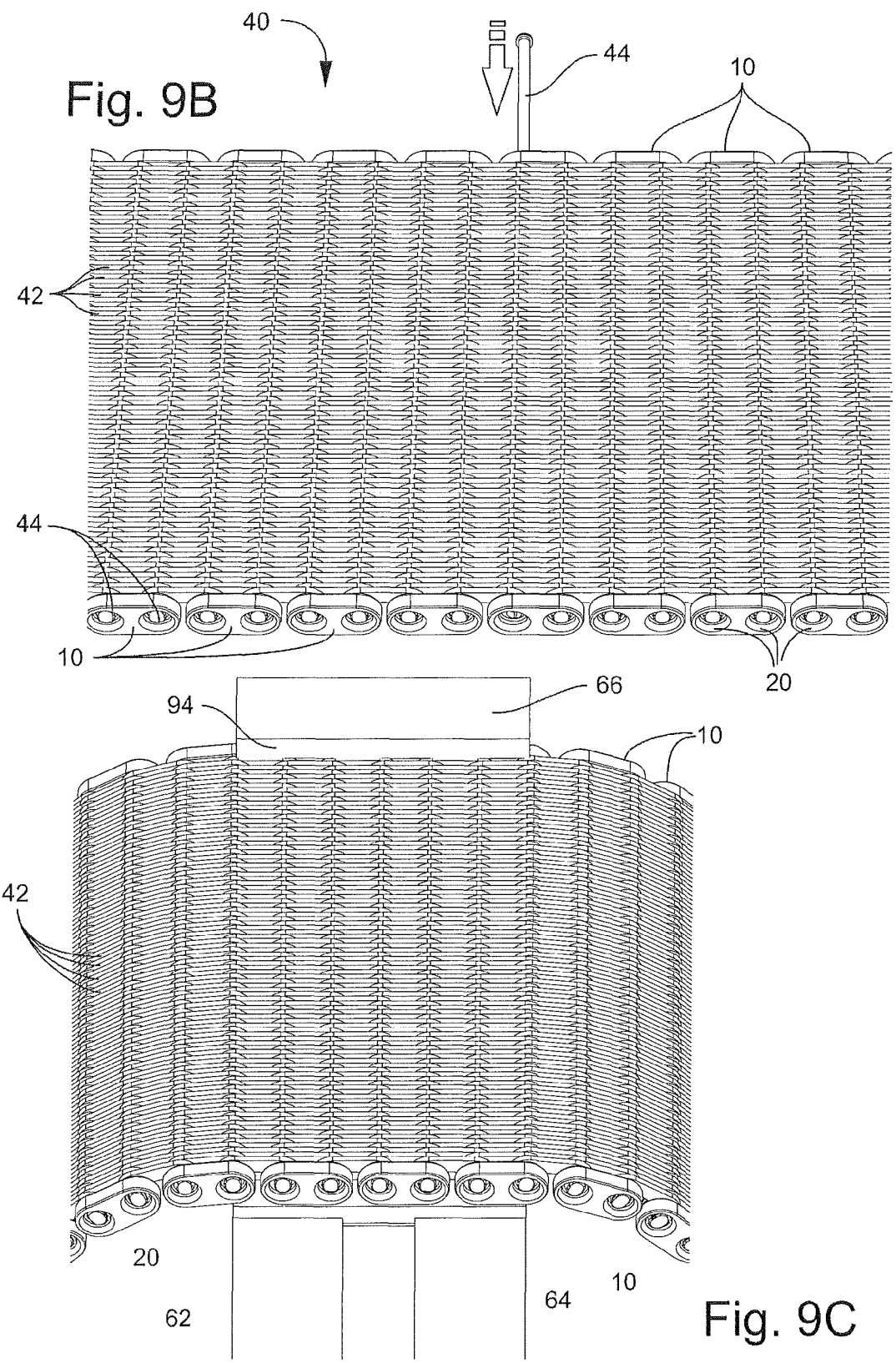

TOOL FOR CONNECTING AND DISCONNECTING CONVEYING CHAIN AND METHOD

PRIORITY CLAIM

Applicant claims priority from U.S. Provisional Patent Application Ser. No. 61/937,870, filed on Feb. 10, 2014.

TECHNICAL FIELD AND BACKGROUND OF THE INVENTION

This application relates to a tool for connecting and disconnecting conveyor chains of the type wherein the links are held together by pins that extend laterally across the width of the conveyor chain, and about which the links pivot as they proceed around the conveyor circuit. This application also discloses a related method of connecting and disconnecting conveyor chains of the type described above.

During the installation, replacement, and maintenance of conveying chains it is often necessary to disconnect or connect chain segments. Disconnection typically requires that the rivets, or "heads", at the end of one or more chain pins be removed at the chain joints where the disconnection is to be made. With the rivets or heads removed, the pin(s) can be extracted from the chain, resulting in disconnected chain segments. Chain connection typically requires that the ends of chain segments be brought together and a "joint" be created by inserting one or more pins through the segment ends, and then securing the pins by forming a rivet or "head" on the pin ends.

With certain types of conveying chain designs, the ends of the chain pins are recessed in the outermost links of the chain and do not project beyond the sides of the chain. While this type of link design provides substantial advantages during operation by protecting the rivets or heads from wear and damage, disconnecting the chain links is made difficult by the fact that the recessed pin rivets or heads are not easily removed. Typical methods of rivet or head removal such as grinding or filing are difficult and time consuming due to the inaccessibility of the rivet or head.

These methods of pin removal may also result in damage to the surrounding chain links. Similarly, chain designs of this type can be difficult to connect. Finally, with the pin ends recessed, typical methods of forming a rivet or head, such as peening or hammering, can be difficult and time consuming. These methods may also result in damage to the surrounding chain links.

SUMMARY OF THE INVENTION

It is therefore an object of the invention to provide a tool that permits quick and easy connection and disconnection of conveyor chain links of the type that are connected using pins with rivets or heads on the pin ends.

It is another object of the invention to provide a tool that permits efficient formation of pin heads on pins that will be recessed when in use.

It is another object of the invention to provide a method of quickly and easily connecting and disconnecting conveyor chain links that are connected by pins extending laterally through the links.

These and other objects and advantages of the invention are achieved by providing a tool for connecting and disconnecting links of a conveyor chain of the type wherein the links are held together by pins that extend transversely through aligned holes extending across a width of the conveyor chain formed by rows of interlocked links, and around which the interlocked links pivot as they travel around a conveyor circuit. The tool includes a base, a chain guide plate mounted on the base for supporting a length of conveyor chain in a fixed position relative to the base, and a backup block carried on the base. A pin extraction/insertion block is positioned on the base with the chain guide plate positioned between the backup block and the pin extraction/insertion block. A ram is carried on the pin extraction/insertion block for extracting a pin from a position in aligned holes in adjacent links while the chain is held in its fixed position, and an insertion rod is carried on the pin extraction/insertion block for inserting a pin in aligned holes in adjacent links.

In accordance with another embodiment of the invention, the ram includes a threaded screw mounted in a threaded bore in the pin extraction/insertion block and positioned for concentric axial movement towards and away from a selected pin of the conveyor chain to be removed from the conveyor chain.

In accordance with another embodiment of the invention, the insertion rod is mounted in the pin extraction/insertion block and is positioned for concentric axial movement towards and away from a selected pin of the conveyor chain to be inserted into the conveyor chain.

In accordance with another embodiment of the invention, the chain guide plate includes teeth spaced to receive and position a length of chain, with the pin to be removed or inserted in an aligned position with the ram or the insertion rod.

In accordance with another embodiment of the invention, the chain guide plate is removable from the base and replaceable to permit a selected chain guide plate with a pitch corresponding to the pitch of the conveyor chain to be positioned on the base.

In accordance with another embodiment of the invention, the backup block includes an overhang extending over a portion of the chain guide plate to lock the conveyor chain onto the chain guide plate.

In accordance with another embodiment of the invention, the ram includes a handle positioned on a distal end of the ram and extendable radially outwardly from a longitudinal axis of the ram for allowing the user to apply increased torque to the ram as it is rotated.

In accordance with another embodiment of the invention, the backup block includes a bore axially aligned with the threaded bore in which the ram is mounted to accommodate the pin as it is extracted from the chain links.

In accordance with another embodiment of the invention, the ram includes a tip adapted for centering the ram on the pin to be extracted from the chain links.

In accordance with another embodiment of the invention, a tool for connecting and disconnecting links of a conveyor chain of the type wherein the links are held together by pins that extend transversely through aligned holes extending across a width of the conveyor chain formed by rows of interlocked links, and around which the interlocked links pivot as they travel around a conveyor circuit is provided, that includes a base, a chain guide plate mounted on the base for supporting a length of conveyor chain in a fixed position relative to the base and a backup block carried on the base. A pin extraction/insertion block is provided for being positioned on the base with the chain guide plate positioned between the backup block and the pin extraction/insertion block. A ram is carried on the pin extraction/insertion block for removing an enlarged head from the pin, and an extraction station carried on the pin extraction/insertion block for extracting the pin with the enlarged head removed from its position in the aligned holes in adjacent links while the chain is held in its fixed position. An insertion rod is carried on the pin extraction/insertion block for inserting a pin in aligned holes in adjacent links.

In accordance with another embodiment of the invention, a method of connecting and disconnecting links of a conveyor chain of the type wherein the links are held together by pins that extend transversely through aligned holes extending across a width of the conveyor chain formed by rows of interlocked links, and around which the interlocked links pivot as they travel around a conveyor circuit is provided, and includes the steps of providing a base, a chain guide plate mounted on the base for supporting a length of conveyor chain in a fixed position relative to the base, a backup block carried on the base, a pin extraction/insertion block positioned on the base with the chain guide plate positioned between the backup block and the pin extraction/insertion block, a ram carried on the pin extraction/insertion block for extracting a pin from a position in aligned holes in adjacent links while the chain is held in its fixed position, and an insertion rod carried on the pin extraction/insertion block for inserting a pin in aligned holes in adjacent links. A length of conveyor chain is placed on the chain guide plate, and an enlarged head of a selected pin is removed. The selected pin is removed from the chain links and the conveyor chain is moved to the insertion rod. A pin is inserted into aligned holes of the chain links with the insertion rod.

In accordance with another embodiment of the invention, the step of removing the enlarged head of the selected pin is carried out with the ram.

In accordance with another embodiment of the invention, the method includes providing an extraction station carried on the pin extraction/insertion block, and the steps of removing the selected pin includes the step of moving the selected pin from the ram to the extraction station and extracting the selected pin from the chain links at the extraction station.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 7 is a fragmentary enlarged view of the backup block of the tool shown in FIGS. 4 and 5;

FIGS. 9A-F are sequential illustrations showing connection of the chain links using the tool shown in FIGS. 4-7;

DESCRIPTION OF THE PREFERRED EMBODIMENT AND BEST MODE

Figure 1:
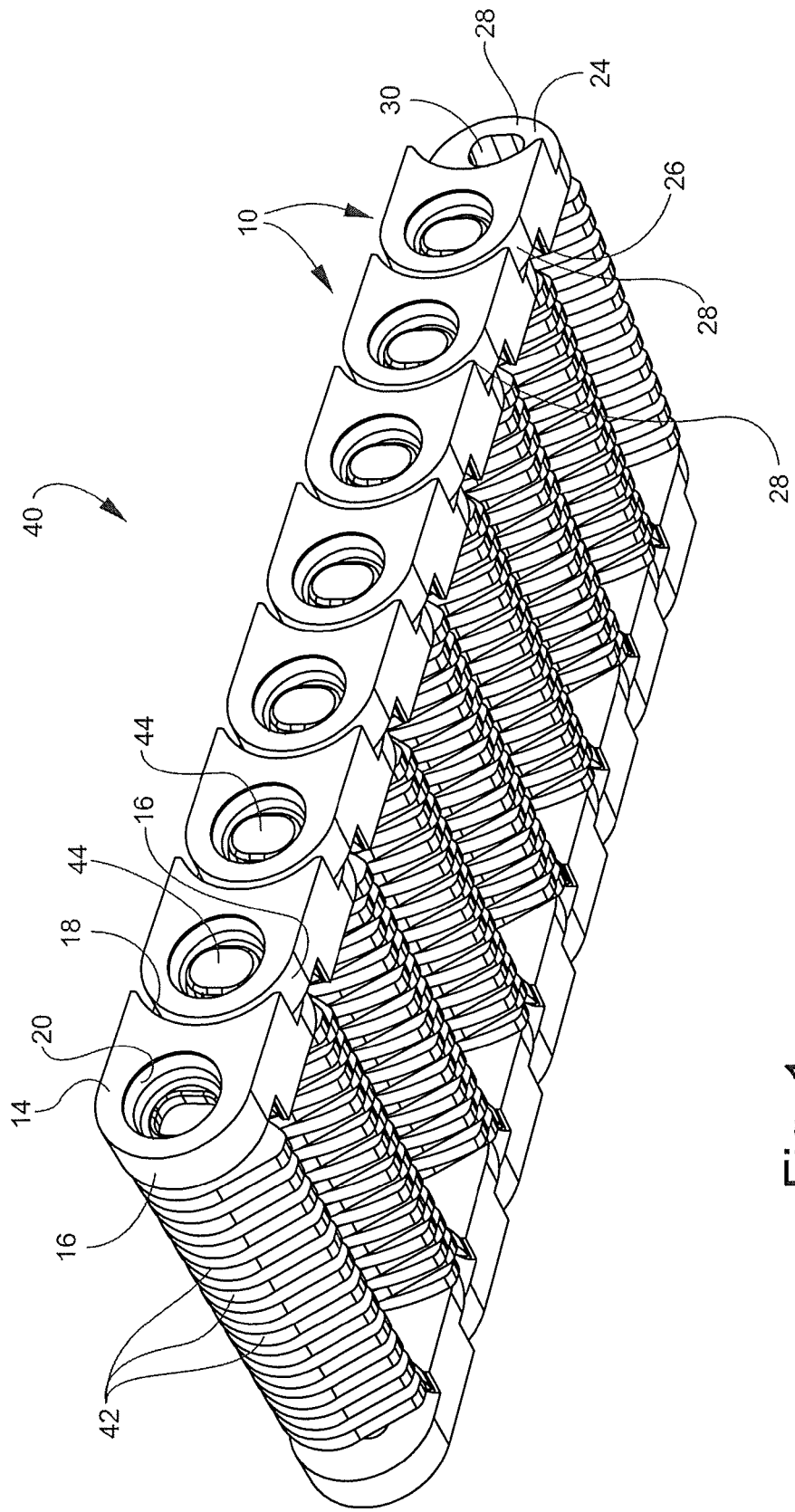
FIG. 1 is a bottom perspective view of a length of conveyor chain of the type where the links of the chain are connected together with recessed link pins.
Figure 2:
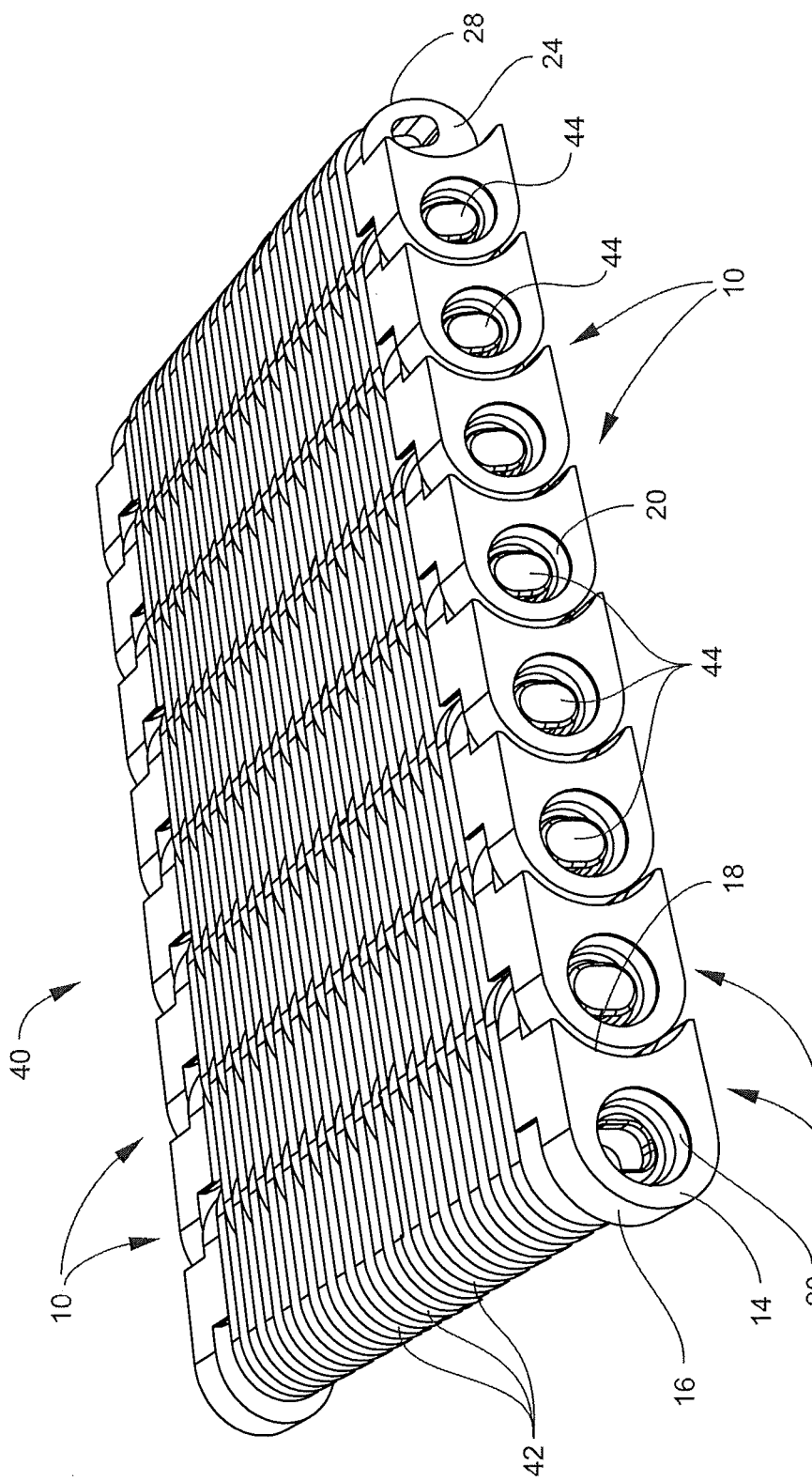
FIG. 2 is a view similar to FIG. 2 showing the top and side of the length of chain.

Referring now specifically to FIGS. 1 and 2 of the drawings, an assembled length of conveyor chain 40 is shown, and includes end links 10. The links 10 include a first link segment 12 having an outer wall 14 in a first vertical plane defining a protective bearing surface having a forward-facing convex face 16, and a rearward-facing concave face 18 and a first, countersunk, pin access bore 20 extending perpendicularly through the link 10 between the forward-facing convex face 16 and the rearward-facing concave face 18. Each pin access bore 20 can be circular or non-circular. A second link segment 22 is integrally-formed with the first link segment 10 and has an outer wall 24 in a second vertical plane defining a protective bearing surface having a forward-facing concave face 26. A rearward-facing convex face 28 is provided and has a second pin access bore 30 extending perpendicularly through the link 10 between the forward-facing convex face 26 and the rearward-facing convex face 28. The forward-facing convex face 16 of the first link segment and the forward-facing concave face 26 of the second link segment 22 have respective complementary arcuate shapes adapted to nest with and move relative to a respective rearward-facing concave face 18 and rearward-facing convex face 28 of a like end protector link 10 forward of the end protector link 10 to which the end protector link 10 is nested in the conveyor chain. The rearward-facing convex face 28 of the second link segment 22 and the rearward-facing concave face 18 of the first link segment 12 have respective complementary arcuate shapes adapted to nest with and move relative to a respective forward-facing concave face 26 and forward-facing convex face 16 of a like end protector link 10 rearward of the end protector link 10 to which the end protector link is nested in the conveyor chain.

The assembled chain 40 includes chain links 42 assembled and held in place by pins 44 that have enlarged heads. According to one preferred embodiment, the top half and bottom half of the links 10 are mirror images of each other on either side of a notional longitudinal axis bisecting the first and second pin access bores 20 and 30. This symmetrical design allows a single link design to be used on both sides of the chain 40 and avoids the need to design and manufacture left-hand and right-hand versions, while nevertheless maintaining the same link orientation on both sides of the chain 40. The inner surfaces of the links 10 are also suitable for retaining and guiding the chain on the drive sprockets in the absence of another form of the drive mechanism.

Another view of the chain 40 is shown in FIG. 2.

Figure 3:
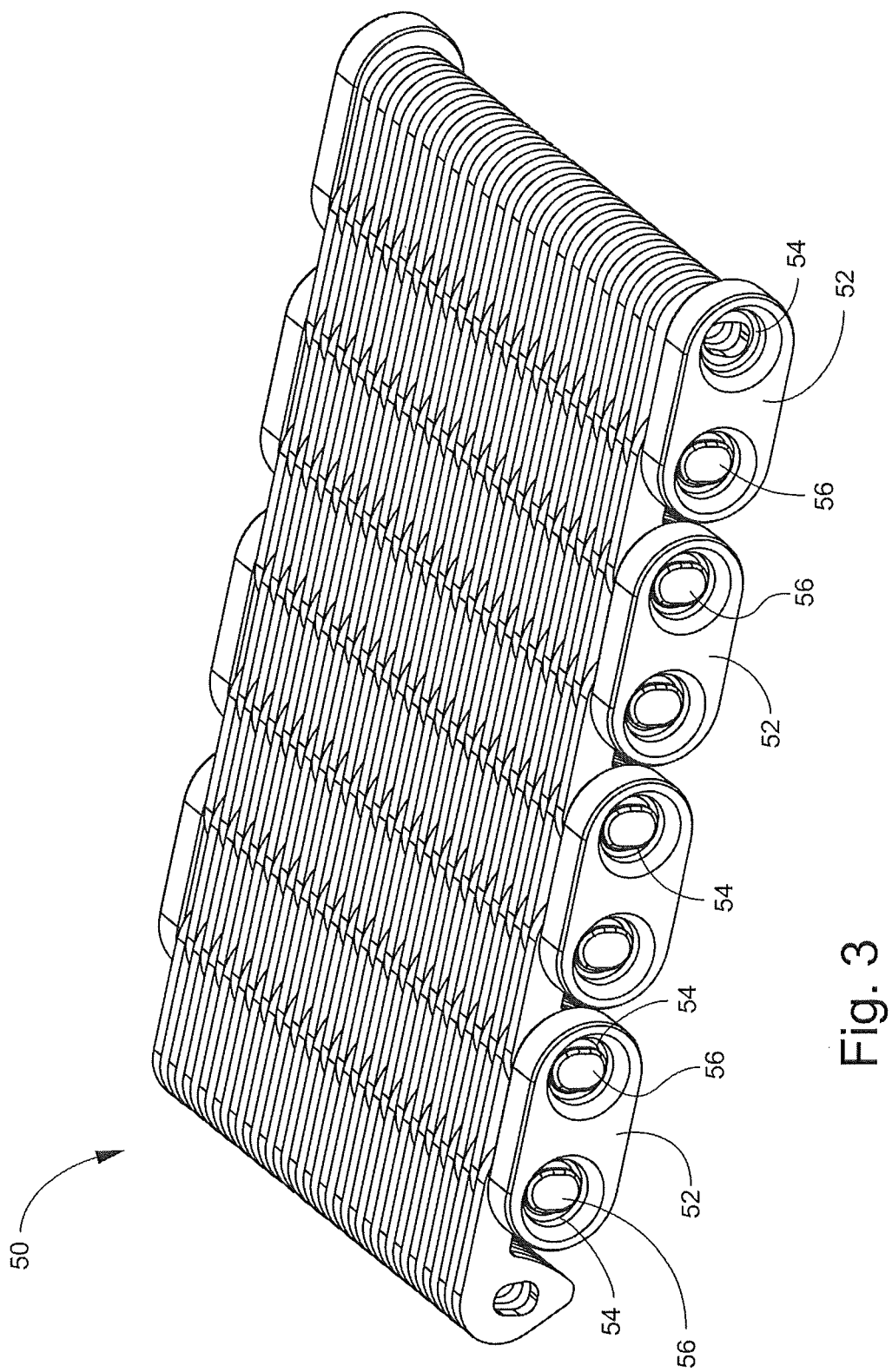
FIG. 3 is a top perspective view of an alternate design of a length of conveyor chain of the type where the links of the chain are connected together with recessed link pins.

Another design of a length of conveyor chain 50 of the type where the links of the chain are connected together with recessed link pins is shown in FIG. 3. An assembled length of the conveyor chain 50 includes end links 52 having recesses 54 in which are positioned pin heads 56. In the discussion below, the invention has equal application to the chain 40 shown in FIGS. 1-2, and the chain 50 shown in FIG. 3. Similarly, the invention has application to any conveyor chain where pins are used to connect links, but has particularly advantageous application where the heads of the pins connecting the links together are recessed and therefore difficult to access.

Figure 4:
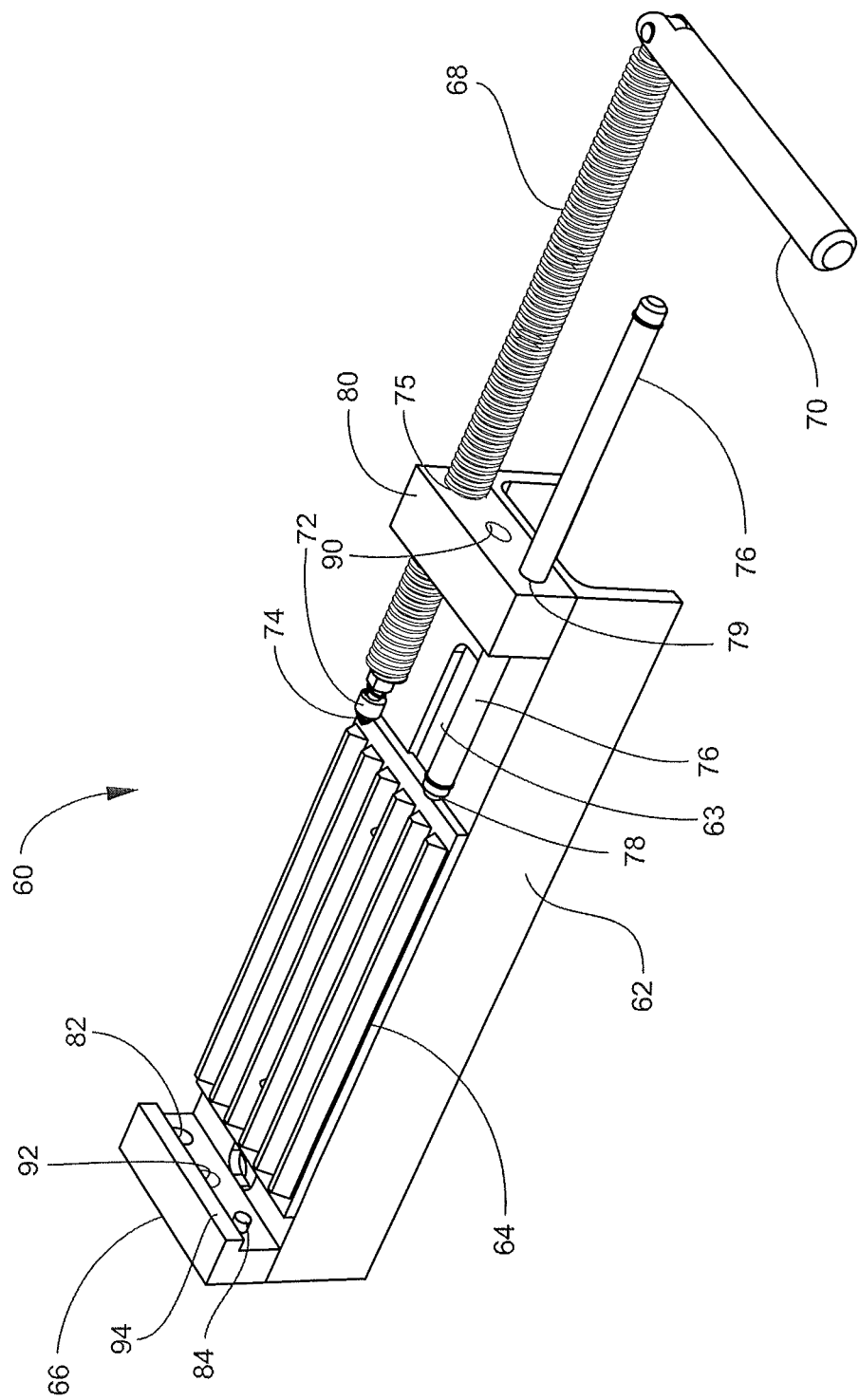
FIG. 4 is a top perspective view of a tool for inserting and removing link pins to connect and disconnect links of the chain.
Figure 5:
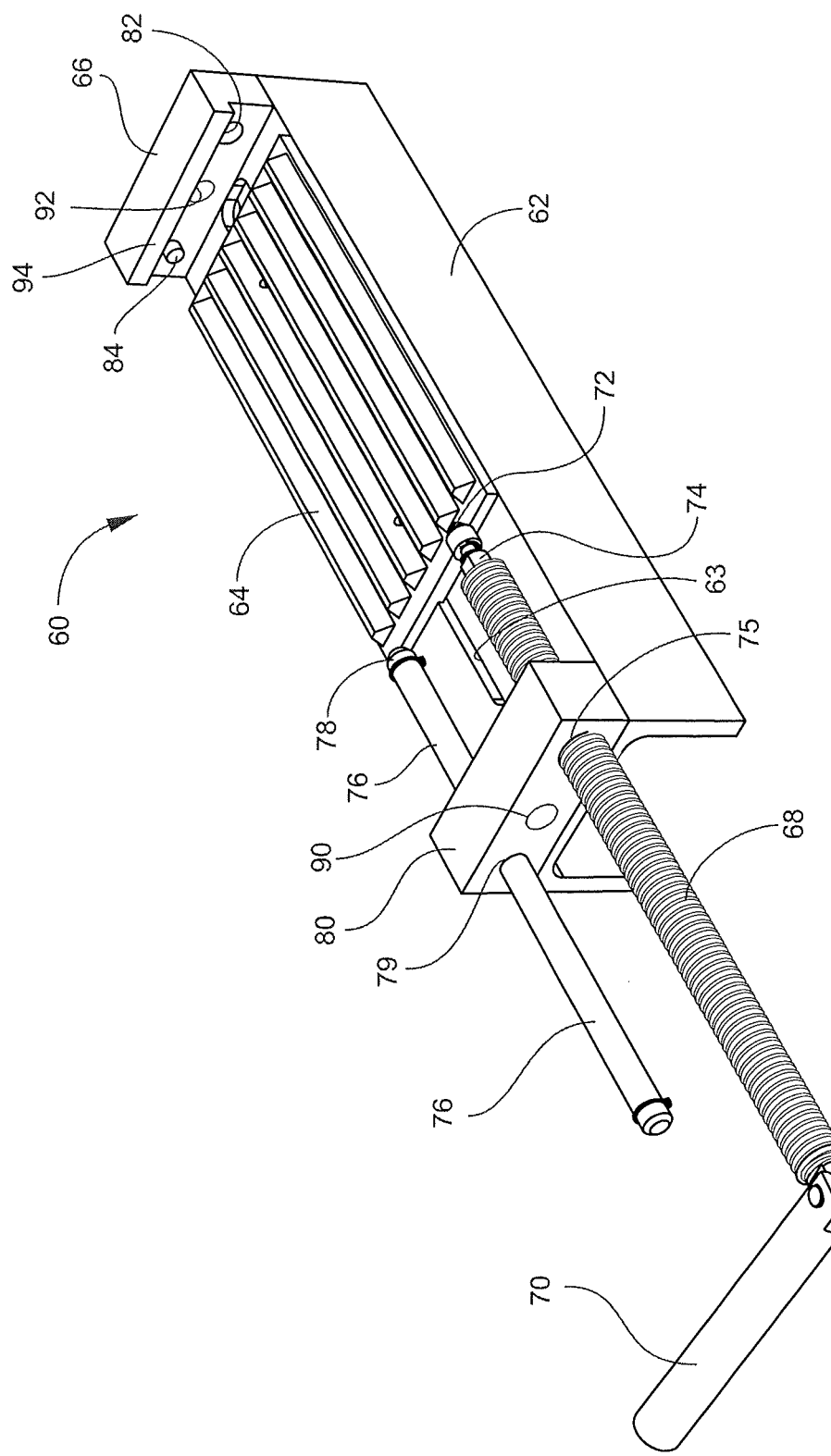
FIG. 5 is a another top perspective view of a tool for inserting and removing link pins to connect and disconnect links of the chain.
Figure 6:
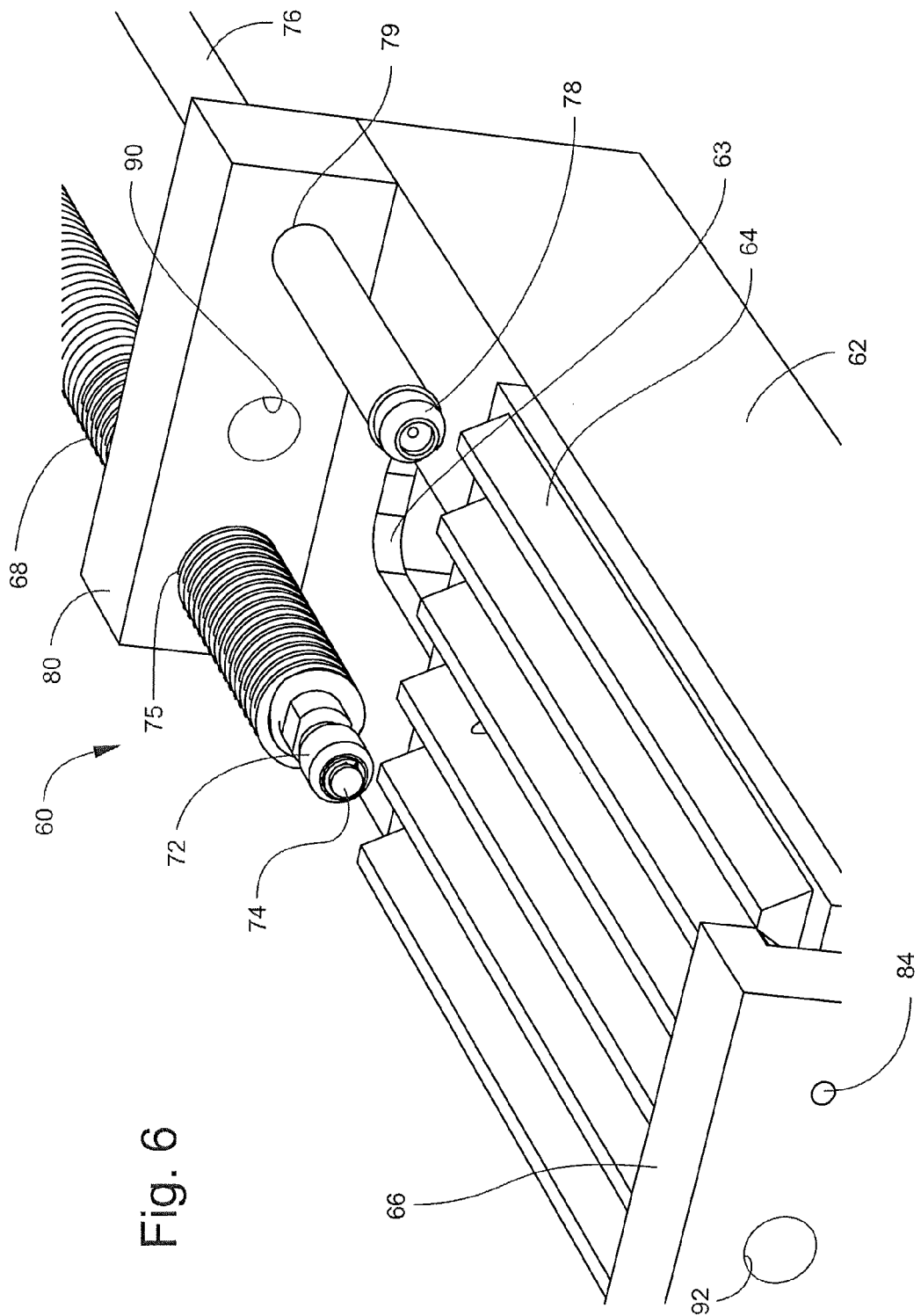
FIG. 6 is a fragmentary enlarged view of an end of the tool shown in FIGS. 4 and 5.

Referring now to FIGS. 4-6, a pin insertion and extraction tool 60 is shown at reference numeral 60. The tool 60 includes a base 62 having an elongate mounting slot 63, a toothed chain guide plate 64, a backup block 66, a threaded ram 68 with handle 70 and an attached spring-loaded guide tip 72 with a hardened extraction pin 74. The ram 68 is mounted in a threaded bore 75 in an extraction/insertion block 80.

A drive pin insertion rod 76 with a magnetic insert 78 on one end is mounted in a bore 79 in the extraction/insertion block 80.

The toothed chain guide plate 64 has a tooth profile which mates with the matching tooth profile on the bottom of a conveying chain, such as chain 40 of FIGS. 1 and 2, or chain 50 of FIG. 3, and serves to positively locate and retain the chain 40 in the tool 60. The toothed chain guide plate 64 is designed to slide along the base 62 between the extraction/insertion block 80 and the backup block 66 to accommodate conveying chains of different widths. See also FIG. 6.

As best shown in FIG. 7, the backup block 66 contains an extraction bore 82 and a locating boss 84. The extraction bore 82 receives the pin 44 that is being removed from the chain 40 during disconnection, if the operator chooses to remove the pin 44 while the pin is still aligned with the ram 68.

The locating boss 84 fits into the recess 20 in the outer chain links 10 and supports the pin 44 during chain connection. Connection is effectuated by inserting a pin 44 through the aligned holes of an adjacent array of links 10 and 42. The pin 44 (FIG. 9B) is inserted by feeding it through the bore 92 in backup block 66.

The backup block 66 includes an overhang 94 adapted to receive one side of the chain 40 during pin head breakage, pin extraction and pin insertion. The overhang 94 is spaced to maintain the chain 40 securely on the chain guide plate 66 and in proper alignment with the extraction bore 82 and a locating boss 84. The backup block 66 is used by manually pushing the chain 40 in the direction of the backup block 66 and holding it in that position during operation.

During chain disconnection, the spring-loaded guide tip 72 serves to locate and center the ram 68 within the recess 20 that contains the pin 44 in the outer chain links 10. As the ram 68 is turned using the handle 70, the hardened extraction pin 74 extends from the spring loaded guide tip 72. The extraction pin 74 is sized to engage the pin 44 but not the surrounding walls of the recess 20. As the extraction pin 74 pushes on the center of the head 44A, FIG. 9A of the pin 44, the periphery of the head 44A of the pin 44 presses against the recess 20 and is prevented from moving with the center of the head 44A. At the point of failure, the center of the pin head 44A separates from the periphery. The pin 44 will then pass through the aligned holes allowing the adjacent links 10 to separate.

Optionally, an extraction position is defined by extraction bores 90 and 92 formed in the extraction/insertion block 80 and backup block 66, respectively. After the 44A of the pin 44, such as pin 44 shown in FIGS. 1 and 2, has been broken off by the ram 68, the chain 40 may be optionally shifted on the chain guide plate 66 into alignment with the extraction bores 90 and 92 so that the pin 44 can be driven out of the length of chain 40 with a hammer or some other extraction tool.

The drive pin insertion rod 76 is used to insert the pre-headed drive pin 44 into the pin end during chain connection. The end of the insertion rod 76 contains a magnetic insert 78 with a concave depression that serves to hold the pin 44 during insertion.

Referring now to FIGS. 8A-E, the method of using the tool 60 to disconnect links from a chain is illustrated sequentially.

Figure 8A:
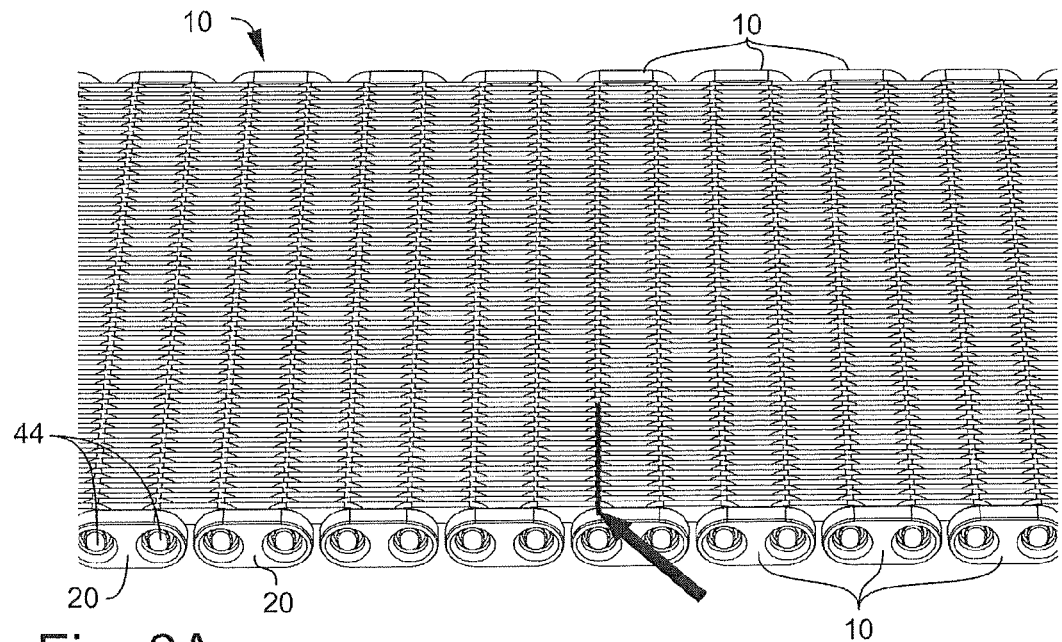
FIGS. 8A-E are sequential illustrations showing disconnection of the chain links using the tool shown in FIGS. 4-7.
Figure 8B:
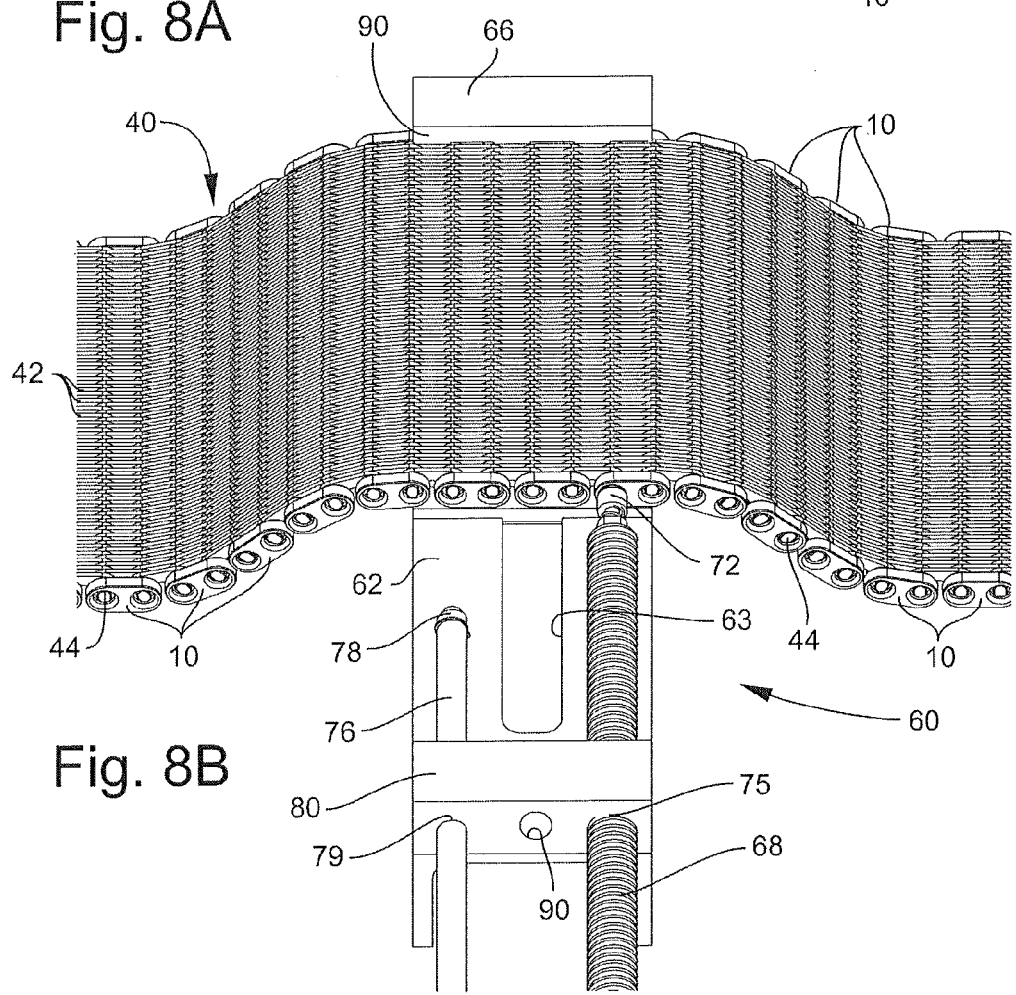
Figure 8C:
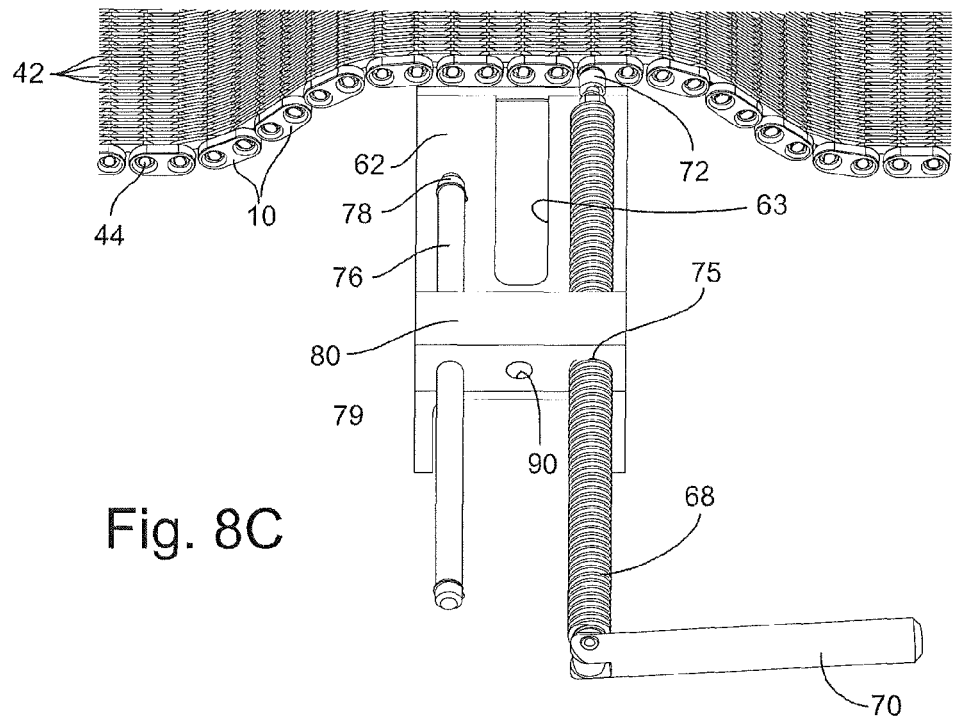
Figure 8D:
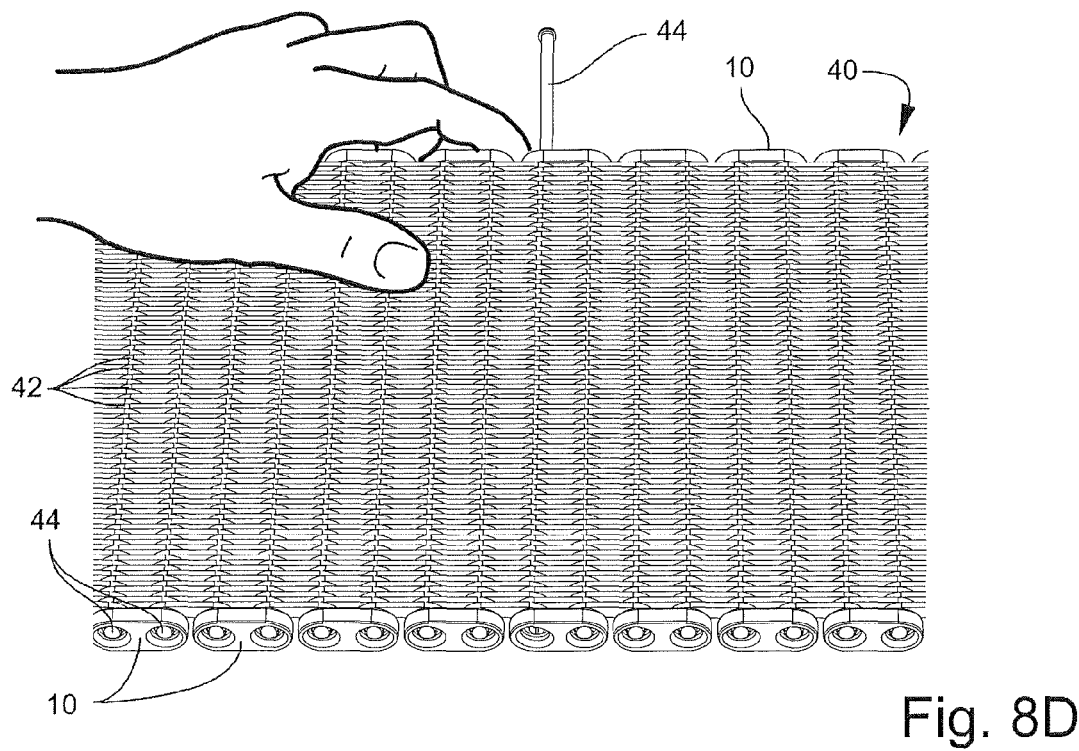
Figure 8E:
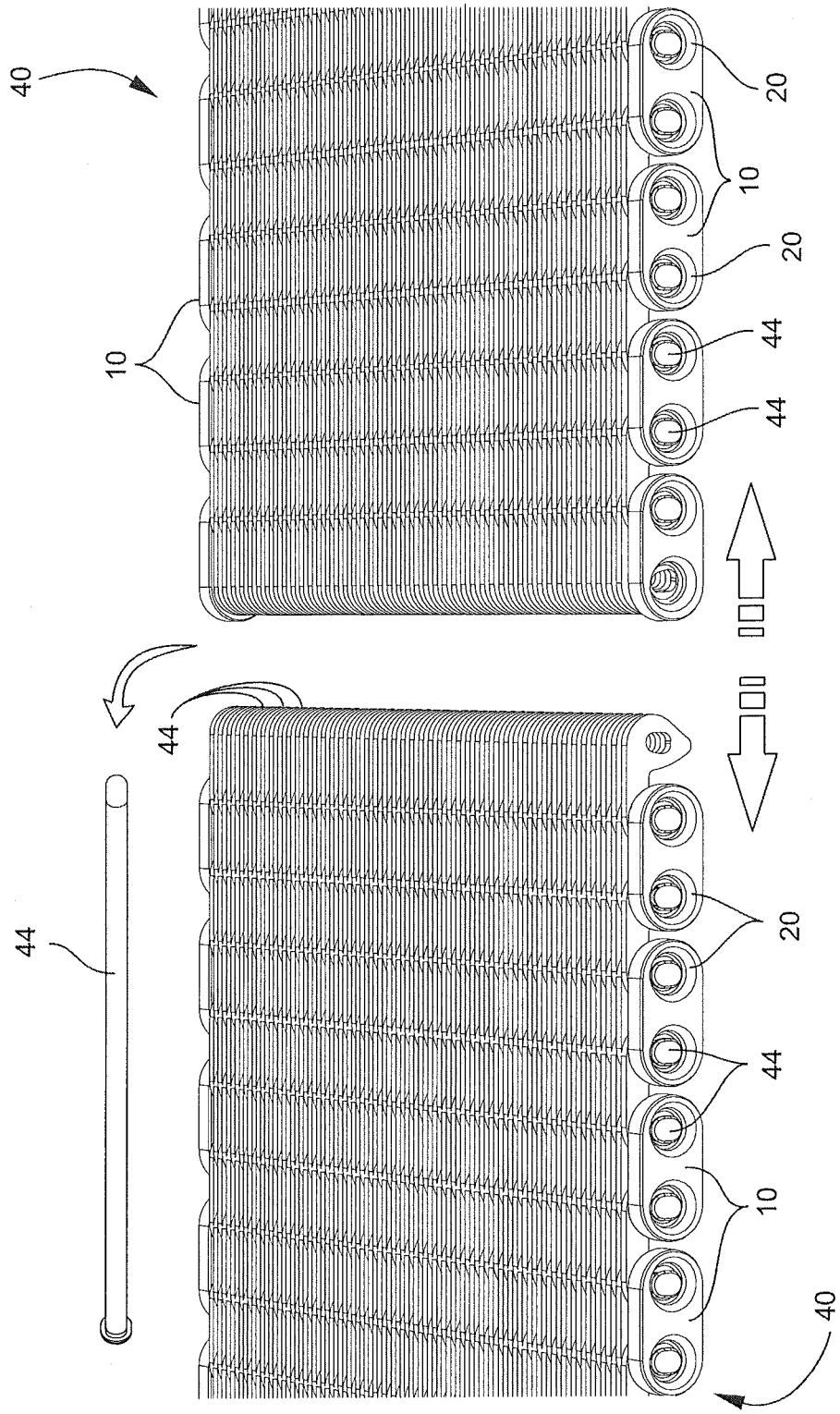

After identifying the chain joint where the chain 40 is to be disconnected, FIG. 8A, the tool 60 is positioned so the downward facing toothed chain links 42 engage the tool's upward facing toothed chain guide plate 64, and the ram 68 is aligned with the pin 44 that is to be removed. See FIG. 8B. The ram 68 is then turned using the handle 70 until the spring loaded guide tip 72 enters the recess 20 in the outermost chain link 10. As the ram 68 is rotated further, the hardened extraction pin 74 is pushed from inside the guide tip 72 until it makes contact with the head 44A of the pin 44. With further rotation of the ram 68, the extraction pin 74 forces the head 44A of the pin 44 into the chain 40, breaking off the head. Continuing to rotate the ram 68, the pin 44 is forced further into the chain 40, as the opposite end of the pin 44 enters the extraction bore 82 in the backup block 66. See FIG. 8C. At this stage, the tool 60 is removed, and the pin 44 which is protruding from the back of the chain 40 is removed, FIG. 8D, and the chain is disconnected. See FIG. 8E.

As noted above, the pin 44 can optionally be removed at the extraction position defined by extraction bores 90 and 92 formed in the extraction/insertion block 80 and backup block 66, respectively after removal of the head 44A of the pin 44.

Figure 9A:
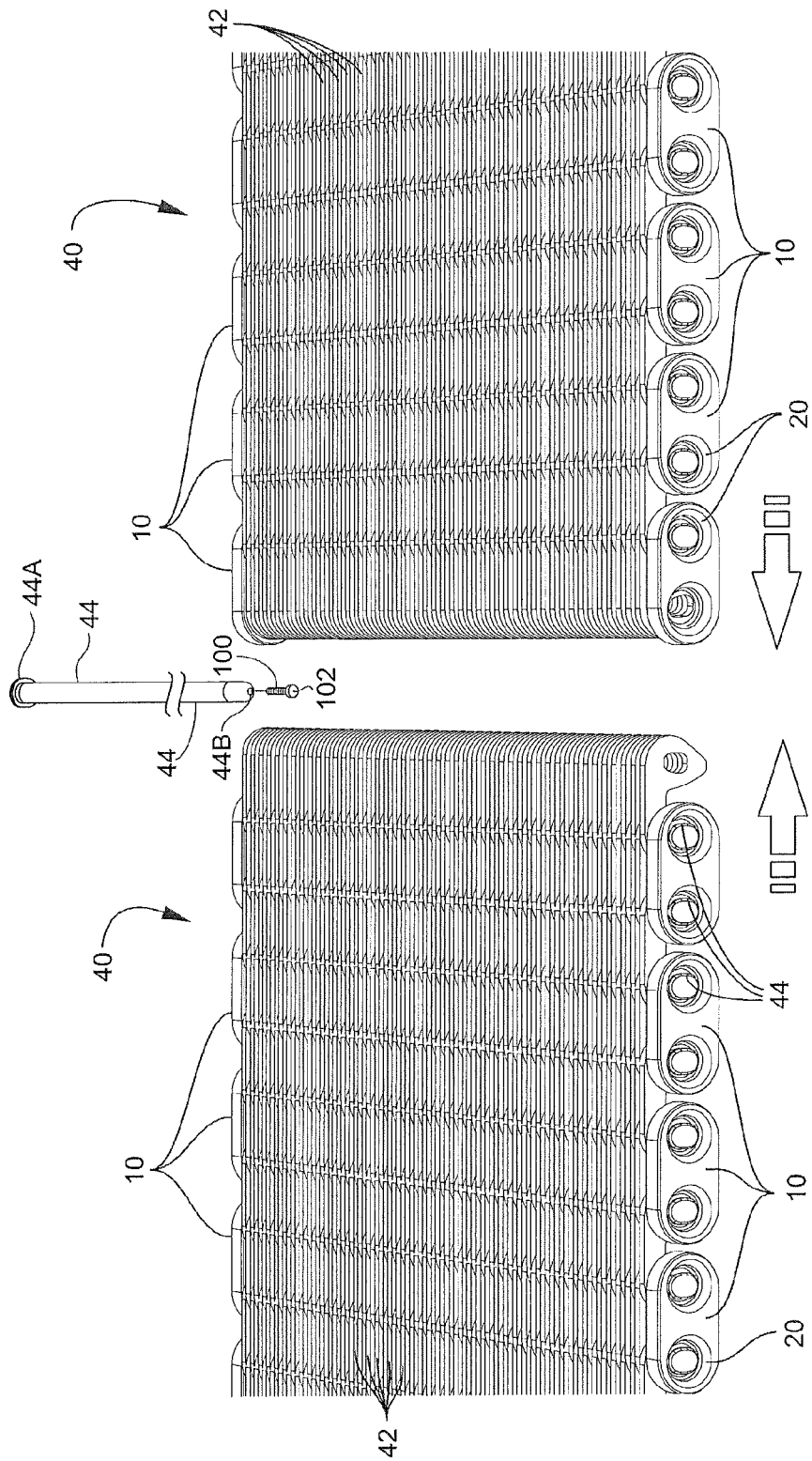
Figure 9D:
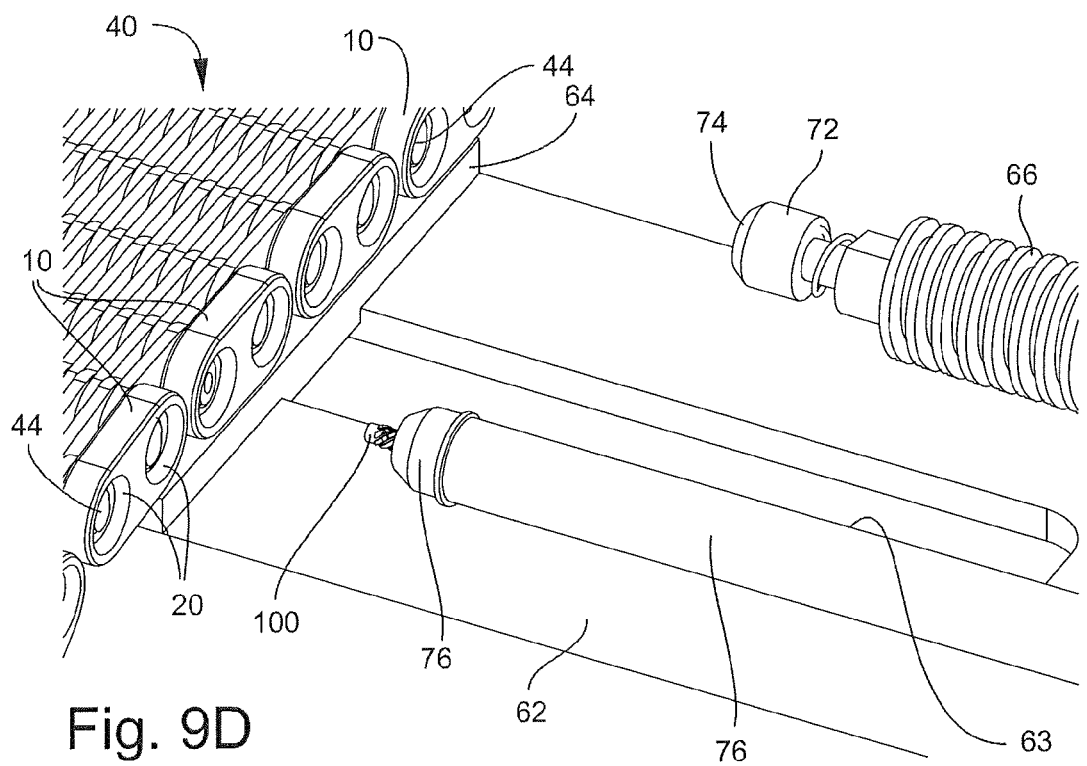
Figure 9E:
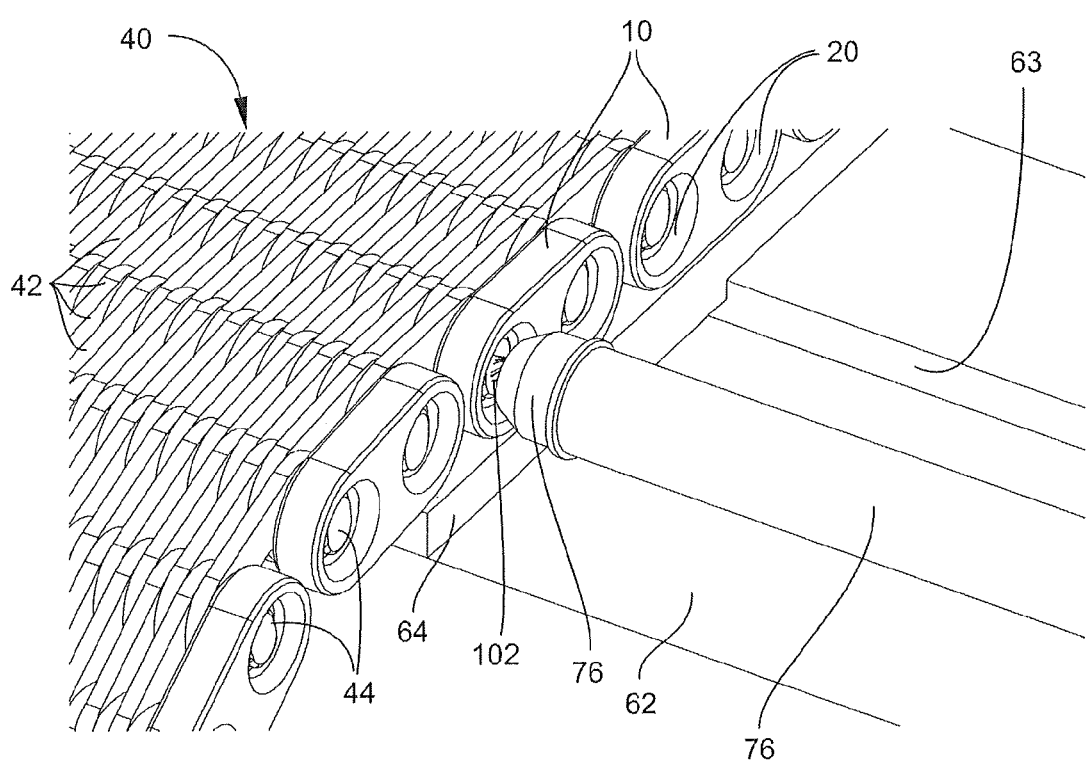
Figure 9F:
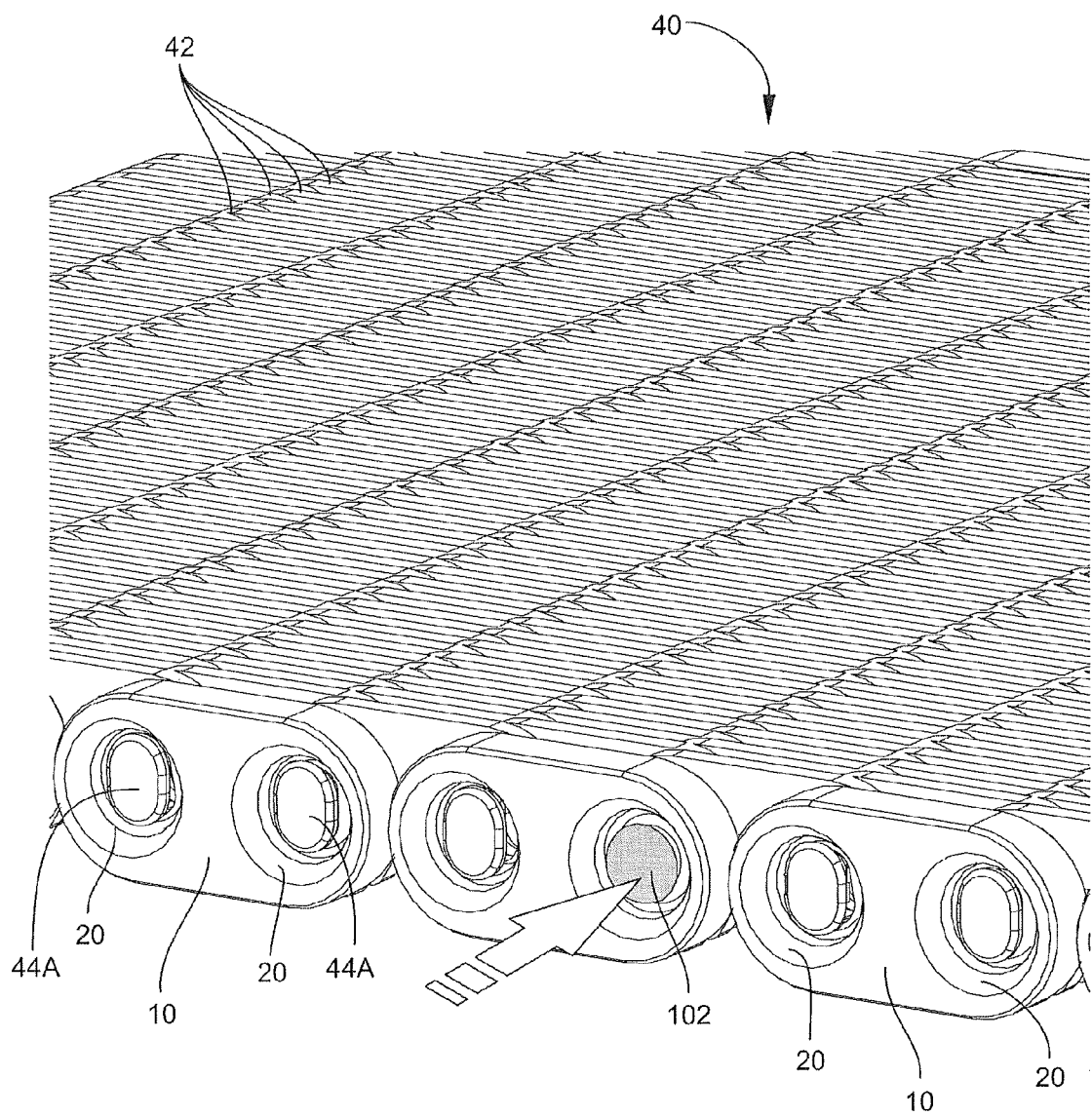

Referring now to FIGS. 9A-F, to connect the links 10, the ends of the chain links 10 and 42 that are to be connected are meshed together, FIG. 9A, and a pin 44 is inserted through the holes in the links. See FIG. 9B. One end of the pin 44 includes the head 44A while the other end of the pin 44 is pre-drilled with a hole 44B that is sized to accept a drive pin 100 with an enlarged head 102. See FIGS. 9A and 9E. The chain 40 is then placed on the toothed chain guide plate 64 so the downward facing toothed chain links engage the tool's upward facing toothed surface, and the pre-headed pin 44 being connected is supported by the locating boss 84 in the backup block 66. The drive pin 100 is then placed in the magnetic insert 78 at the end of the drive pin insertion rod 76. The drive pin insertion rod 76 is then pushed toward the chain 40 so the drive pin 100 enters the pre-drilled hole 44B in the end of the pin 44. The drive pin 100 may be held in the pin 44 by threads, or by a press fit or by any other suitable means.

Alternatively, a head can be formed one end of the pin 44 by peening or riveting.

As shown in FIGS. 10-14, there are several alternative embodiments of the chain guide plate 64 referenced above.

Figure 10:
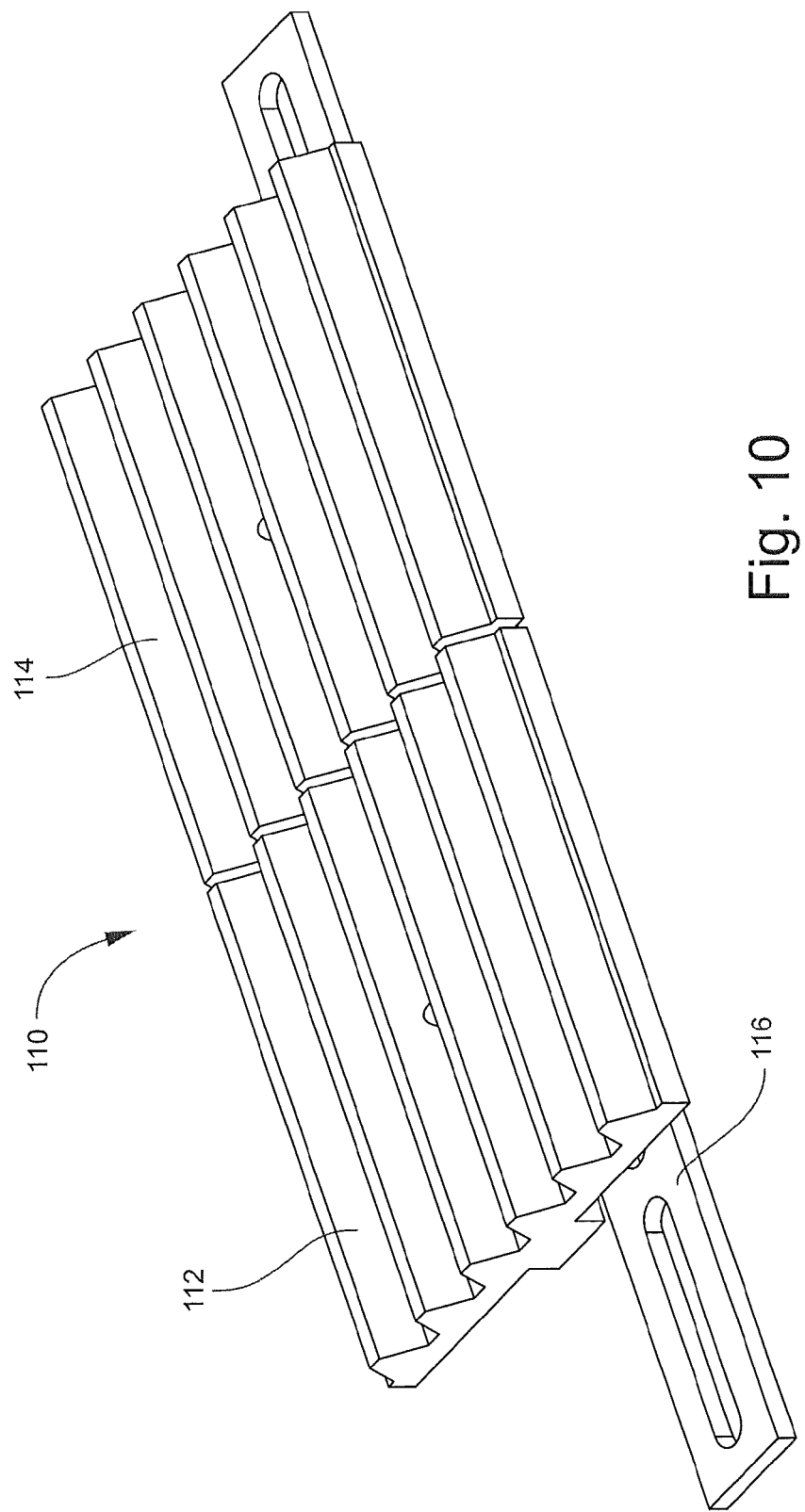
FIGS. 10 and 11 illustrate an alternative embodiment of the chain guide plate that includes two adjacent plate modules that are spaced-apart to accommodate a chain that has a centrally-located non-toothed guide link.
Figure 11:
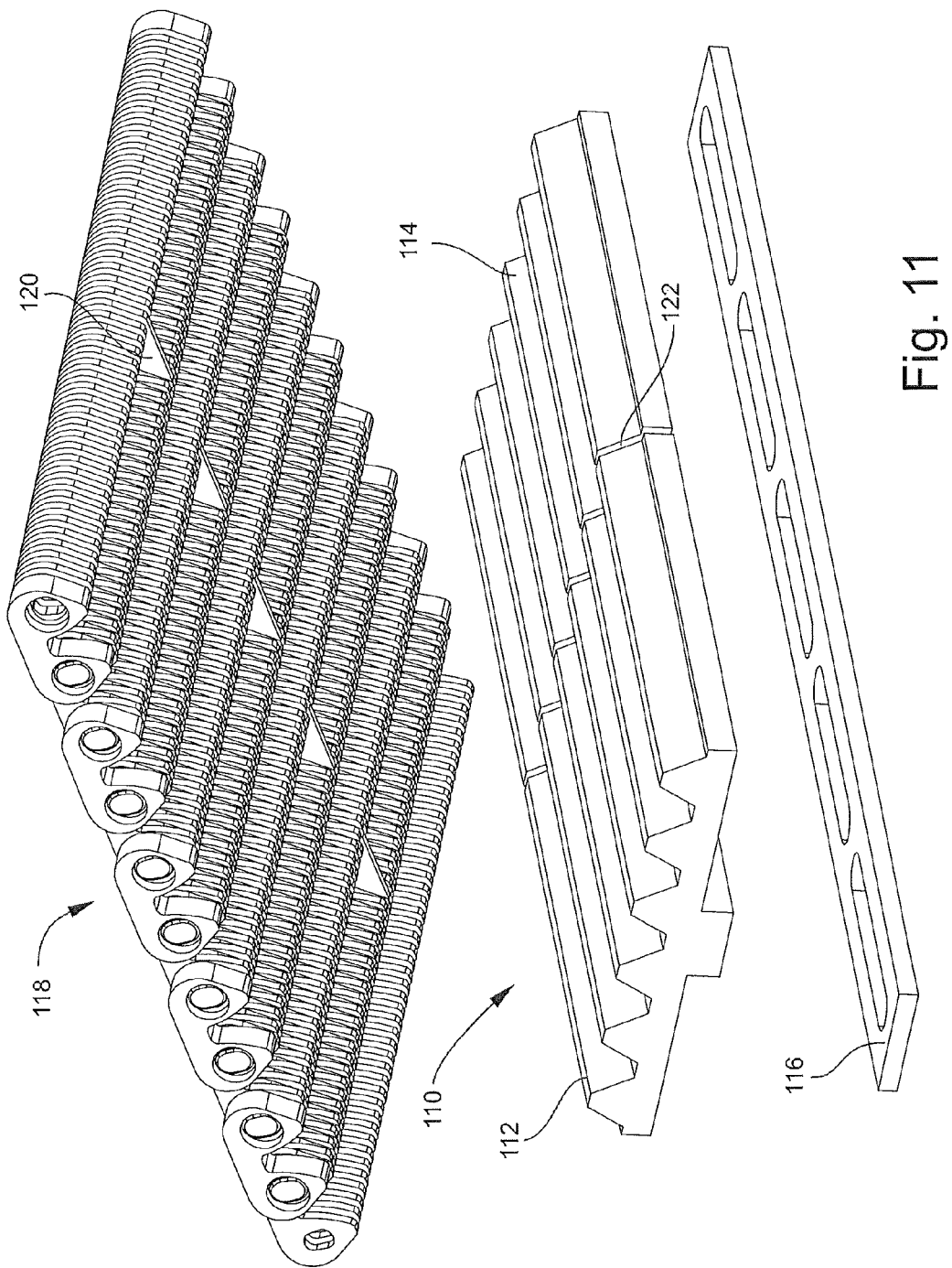

FIG. 10 illustrates a chain guide plate 110 that includes two guide plate modules 112 and 114 that are mounted on a fastening strip 116. This enables the length of the chain guide plate 110 to be matched to the width of the chain 118. Chain 118 includes a centrally-positioned un-toothed guide link 120 that fits into a spaced-apart gap 122 between the guide plate modules 112 and 114, as shown in FIG. 11.

Figure 12:
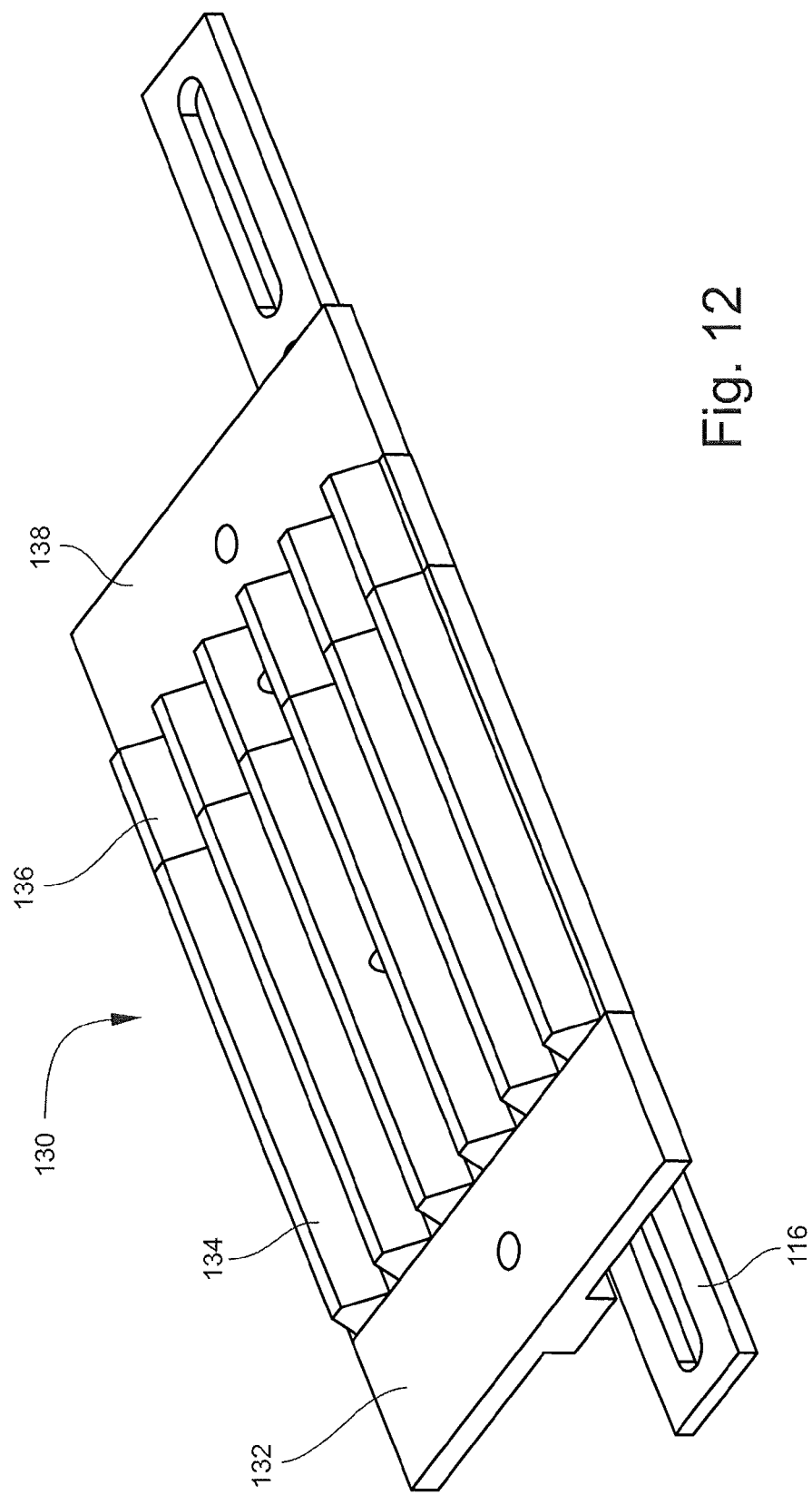
FIGS. 12 and 13 illustrate an alternative embodiment of the chain guide plate that includes two adjacent plate modules and a pair of edge modules without teeth to accommodate a chain that has bands of un-toothed guide links along the chain's outer edges.
Figure 13:
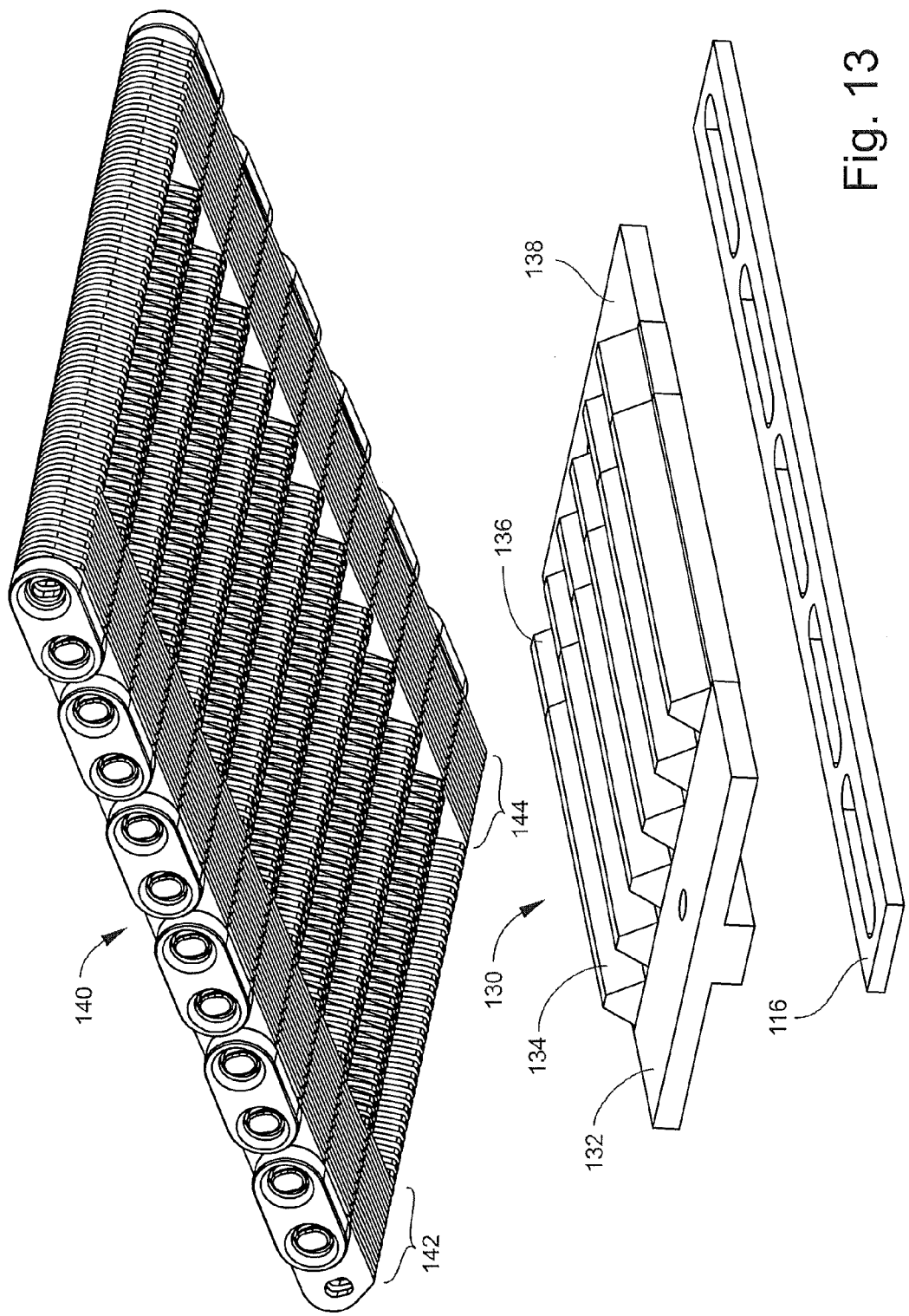

FIG. 12 illustrates a chain guide plate 130 that includes two toothed guide plate modules 134 and 136, and two edge modules 132 and 138. Note that the modules 134 and 136 have differing lengths, and any desired combination of lengths can be used to match the length of the chain guide plate 130 to the width of the chain, for example, chain 140 as shown in FIG. 13. The two edge modules 132 and 138 are flat and coplanar with the base of the teeth on the modules 134 and 136. The design of the chain 140 includes bands of un-toothed guide links 142 and 144 on opposite side edges which are enabled to ride on the flat surface of the edge modules 132 and 138.

Figure 14:
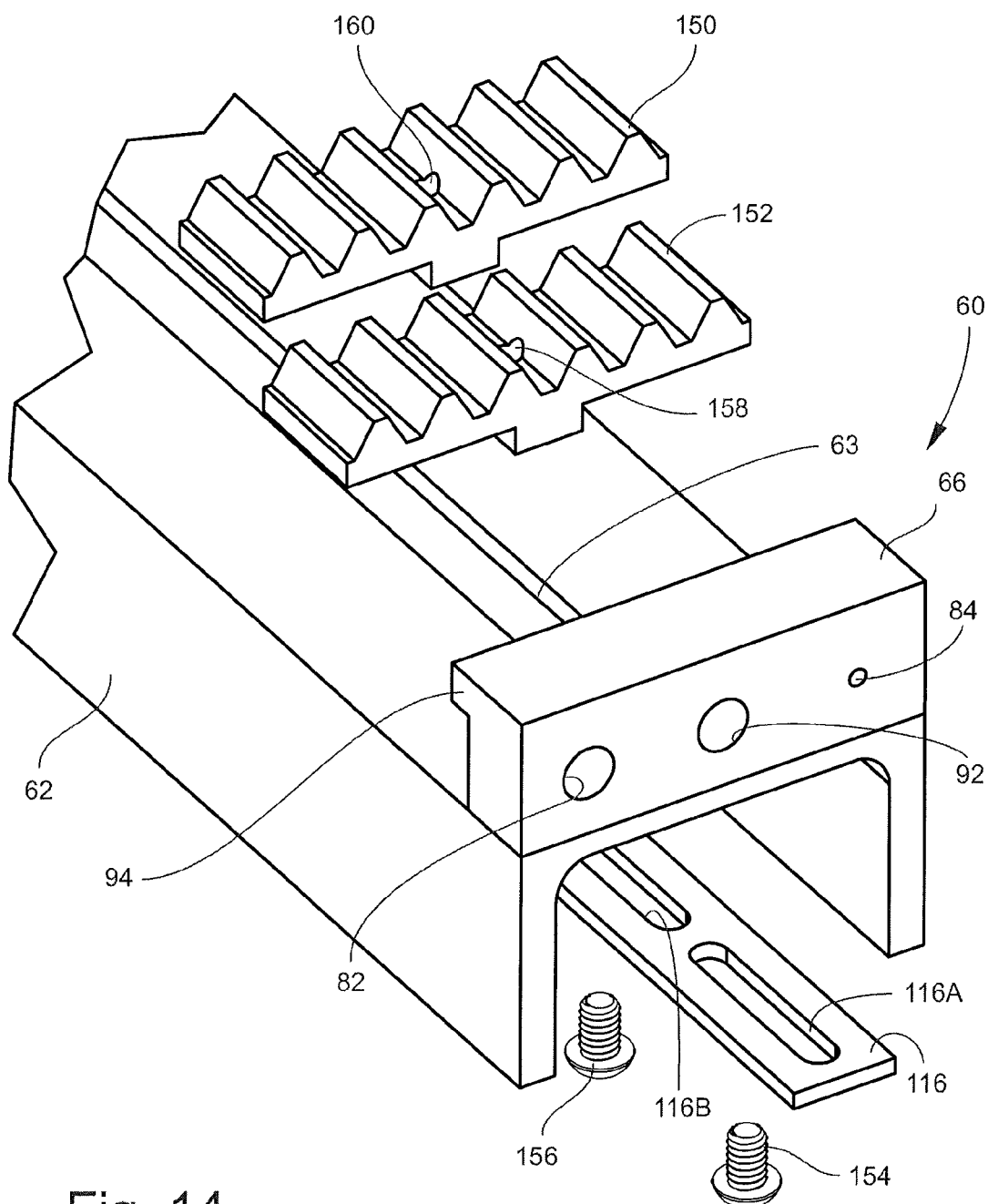
FIG. 14 illustrates a further alternative embodiment of the chain guide plate that includes two adjacent plate modules of different length.

FIG. 14 illustrates a further embodiment wherein two narrow chain guide modules 150, 152 are mounted on the base 62 by bolts 154, 156 that extend upwardly through slots 116A, 116B, and are screwed into threaded mounting holes 158, 160 in the modules 150, 152.

A tool for connecting and disconnecting conveyor chains and method are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A tool for connecting and disconnecting links of a conveyor chain of the type wherein the links are held together by chain pins that extend transversely through aligned holes extending across a width of the conveyor chain formed by rows of interlocked links, and around which the interlocked links pivot as they travel around a conveyor circuit, comprising:
   (a) a base;
   (b) a chain guide plate mounted on the base for supporting a length of conveyor chain in a fixed position relative to the base;
   (c) a backup block carried on the base;
   (d) a chain pin extraction/insertion block for being positioned on the base with the chain guide plate positioned between the backup block and the chain pin extraction/insertion block;
   (e) a ram carried on the chain pin extraction/insertion block for extracting a chain pin from a position in aligned holes in adjacent links while the chain is held in its fixed position, and including a guide tip coaxially-surrounding an extraction pin carried on an end of the ram for coaxially-engaging an end of the chain pin; and
   (f) an insertion rod carried on the chain pin extraction/insertion block for coaxially-inserting a drive pin into a bore in the end of a chain pin in aligned holes in adjacent links.

2. A tool according to claim 1, wherein the ram comprises a threaded screw mounted in a threaded bore in the chain pin extraction/insertion block and positioned for concentric axial movement towards and away from a selected chain pin of the conveyor chain to be removed from the conveyor chain, and wherein the guide tip is retractable and adapted to align the extraction pin with the center of the chain pin.

3. A tool according to claim 1, wherein the insertion rod is mounted in the chain pin extraction/insertion block and is positioned for concentric axial movement towards and away from a selected chain pin of the conveyor chain to be inserted into the conveyor chain.

4. A tool according to claim 3, wherein the chain guide plate comprises a plate with teeth spaced to receive and position a length of chain, with the chain pin to be removed or inserted in an aligned position with the ram or the insertion rod.

5. A tool according to claim 3, wherein the chain guide plate is removable from the base and replaceable to permit a selected chain guide plate with a pitch corresponding to the pitch of the conveyor chain to be positioned on the base.

6. A tool according to claim 1, wherein the backup block includes an overhang extending over a portion of the chain guide plate to lock the conveyor chain onto the chain guide plate.

7. A tool according to claim 2, wherein the ram includes a handle positioned on a distal end of the ram and extendable radially outwardly from a longitudinal axis of the ram for allowing the user to apply increased torque to the ram as it is rotated.

8. A tool according to claim 2, wherein the backup block includes a bore axially aligned with the threaded bore in which the ram is mounted to accommodate the chain pin as it is extracted from the chain links.

9. A tool according to claim 1, wherein the backup block includes an overhang extending over a portion of the chain guide plate to lock the conveyor chain onto the chain guide plate, and wherein the chain guide plate is mounted for selective sliding movement on the base into and out of locking position under the overhang.

10. A tool for connecting and disconnecting links of a conveyor chain of the type wherein end links are provided that each have a respective recessed, centered and aligned hole surrounded by an enlarged recessed end wall, and adapted to retain chain pins that extend transversely through aligned holes extending across a width of the conveyor chain formed by rows of interlocked interior links, and around which the interlocked end links and interior links pivot as they travel around a conveyor circuit, comprising:
    (a) a base;
    (b) a chain guide plate mounted on the base for supporting a length of conveyor chain in a fixed position relative to the base;
    (c) a backup block carried on the base;
    (d) a chain pin extraction/insertion block for being positioned on the base with the chain guide plate positioned between the backup block and the pin extraction/insertion block;
    (e) a ram carried on the chain pin extraction/insertion block for removing an enlarged head from the chain pin, the ram including a retractable guide tip carried on an end of the ram surrounding an extraction in for engaging a center of the enlarged head of the chain pin and breaking the head from the chain pin as the guide tip engages the recessed end wall;
    (f) an extraction station carried on the chain pin extraction/insertion block for extracting the chain pin with the enlarged head removed from its position in the aligned holes in adjacent links while the chain is held in its fixed position; and
    (g) an insertion rod carried on the chain pin extraction/insertion block for coaxially-inserting a drive pin into a bore in the end of a chain pin in aligned holes in adjacent links.

11. A tool according to claim 10, wherein the ram comprises a threaded screw mounted in a threaded bore in the chain pin extraction/insertion block and positioned for concentric axial movement towards and away from a selected chain pin of the conveyor chain to be extracted from the conveyor chain.

12. A tool according to claim 10, wherein the insertion rod is mounted in the chain pin extraction/insertion block and positioned for concentric axial movement towards a selected chain pin of the conveyor chain to be inserted into the conveyor chain.

13. A tool according to claim 10, wherein the extraction station comprises a bore positioned in the chain pin extraction/insertion block and a bore in the backup block and adapted for axial alignment with a chain pin to be extracted from the chain links.

14. A tool according to claim 10, wherein the chain guide plate comprises a plate with teeth spaced to receive and position a length of chain with the chain pin to be removed or inserted in an aligned position with the ram or the insertion rod.

15. A tool according to claim 10, wherein the chain guide plate is available from the base and replaceable to permit a selected chain guide plate with a pitch corresponding to the pitch of the conveyor chain to be positioned on the base.

16. A tool according to claim 10, wherein the backup block includes an overhang extending over a portion of the chain guide plate to lock the conveyor chain onto the chain guide plate.

17. A tool according to claim 10, wherein the ram includes a handle positioned on a distal end of the ram and extendable radially outwardly from the longitudinal axis of the ram for allowing the user to apply increased torque to the ram as it is rotated.

18. A tool according to claim 10, wherein the backup block includes a bore axially aligned with the threaded bore in which the ram is mounted to accommodate the chain pin as it is extracted from the chain links.

19. A tool according to claim 10, wherein the ram includes a tip adapted for centering the ram on the chain pin to be extracted from the chain links.

20. A method of connecting and disconnecting links of a conveyor chain of the type wherein the links are held together by chain pins that extend transversely through aligned holes extending across a width of the conveyor chain formed by rows of interlocked links, and around which the interlocked links pivot as they travel around a conveyor circuit, comprising the steps of:
   (a) providing a base, a chain guide plate mounted on the base for supporting a length of conveyor chain in a fixed position relative to the base, a backup block carried on the base; the chain guide plate adapted for selective movement between a locked position under an overhang on the backup block and an unlocked position, a chain pin extraction/insertion block positioned on the base with the chain guide plate positioned between the backup block and the pin extraction/insertion block, a ram carried on the chain pin extraction/insertion block for extracting a chain pin from a position in aligned holes in adjacent links while the chain is held in its fixed position, and an insertion rod carried on the chain pin extraction/insertion block for inserting a chain pin in aligned holes in adjacent links;
   (b) placing a length of conveyor chain on the chain guide plate and moving the chain guide plate under the overhang in a backup block to lock the chain guide plate in a chain pin-removing position;
   (c) removing an enlarged head of a selected chain pin;
   (d) removing the selected chain pin from the chain links;
   (e) moving the conveyor chain to the insertion rod; and
   (f) inserting a drive pin into a preformed bore on an end of a chain pin with the insertion rod.

21. A method according to claim 20, wherein the step of removing the enlarged head of the selected chain pin is carried out with the ram.

22. A method according to claim 20, wherein the method includes providing an extraction station carried on the chain pin extraction/insertion block, and the steps of removing the selected chain pin includes the step of moving the selected chain pin from the ram to the extraction station and extracting the selected chain pin from the chain links at the extraction station.

23. A tool for connecting and disconnecting links of a conveyor chain of the type wherein the links are held together by end links that each define a respective recessed, centered and aligned hole surrounded by an enlarged recess end wall, and adapted to retain pins that extend transversely through aligned holes extending across a width of the conveyor chain formed by rows of interlocked interior links, and around which the interlocked end links and interior links pivot as they travel around a conveyor circuit, comprising:
   (a) a base;
   (b) a chain guide plate mounted on the base for supporting a length of conveyor chain in a fixed position relative to the base;
   (c) a backup block carried on the base, including an overhang extending over a portion of the chain guide plate to lock the conveyor chain onto the chain guide plate, and wherein the chain guide plate is mounted for selective sliding movement on the base into and out of locking position under the overhang;
   (d) a chain pin extraction/insertion block for being positioned on the base with the chain guide plate positioned between the backup block and the chain pin extraction/insertion block;
   (e) a ram carried on the pin extraction/insertion block for removing an enlarged head from the chain pin;
   (f) an extraction station carried on the chain pin extraction/insertion block for extracting the chain pin with the enlarged head removed from its position in the aligned holes in adjacent links while the chain is held in its fixed position; and
   (g) an insertion rod carried on the chain pin extraction/insertion block for inserting a chain pin in aligned holes in adjacent links.

24. A tool according to claim 23, wherein the ram includes a retractable, spring-loaded guide tip carried on an end of the ram surrounding an extraction pin for engaging the center of the enlarged head of the pin and breaking the head from the pin as the ram engages the recessed end wall.

\* \* \* \* \*